July 11, 1950     L. A. COLLINS     2,514,845
BAKING TRAY
Filed May 8, 1947
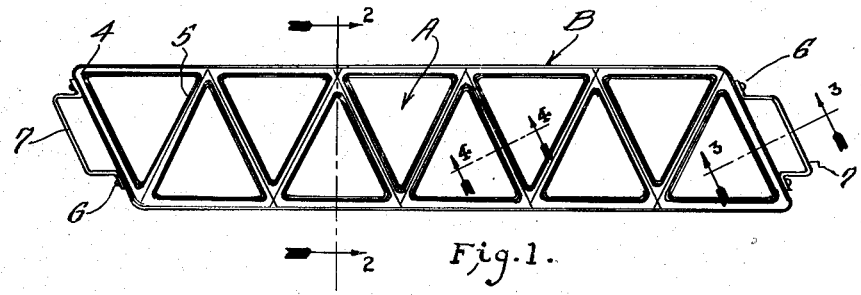
INVENTOR
Linza A. Collins
BY Wilfred E. Lawson
ATTORNEY Patented July 11, 1950

2,514,845

UNITED STATES PATENT OFFICE 2,514,845

BAKING TRAY

Linza A. Collins, Wichita, Kans.

Application May 8, 1947, Serial No. 746,826

1 Claim. (Cl. 99—430)

This invention relates to a baking tray and of a type especially designed for the baking of pies, and it is primary an object of the invention to providing a device of this kind to facilitate the serving of individual pieces.

Furthermore, it is an object of the invention to provide a tray of this kind so constructed that when a plurality of such trays are in use, effective utilization may be had of all the oven space.

A still further object of the invention is to provide a device of this kind which is especially advantageous for use in bakeries or such locations where pies are baked in quantities.

The invention consists in the details of construction and in the combination and arrangement of the several parts of my improved baking tray, whereby certain advantages are attained, as will be hereinafter more fully set forth.

In order that my invention may be better understood, I will now proceed to describe the same with reference to the accompanying drawing, wherein:

Figure 1 is a view in top plan of a baking tray constructed in accordance with one embodiment of the invention;

Figure 2 is an enlarged transverse sectional view taken substantially on the line 2—2 of Figure 1;

Figure 3 is a detailed sectional view taken substantially on the line 3—3 of Figure 1;

Figure 4 is a fragmentary detailed sectional view taken substantially on the line 4—4 of Figure 1;

Figure 5 is a view in top plan of a baking tray constructed in accordance with another embodiment of the invention; and Figure 6 is a sectional view taken substantially on the line 6—6 of Figure 5.

In the embodiment of the invention as illustrated in Figures 1-4, the tray comprises an elongated body member B in substantially the form of a parallelogram but wherein the longitudinal axis is materially in excess of the width. This body B is formed of one sheet of material and the marginal portions of this sheet 1 are defined by the integrally formed depending flanges 2, and at spaced points therealong the sheet 1 is provided with the depressions A herein disclosed as triangular in form and with adjacent trays in close proximity. These depressions A constitute individual baking chambers or pans and the bottom wall 3 of each of the chambers or pans is flush with the lower or free margin of the flanges 2.

The flanges 2 and the adjacent portions of the pans A are slightly spaced apart as at 4 with such portions 4 flush or coplanar. There are also flat portions 5 between adjacent pans A and such portions 5, as well as 4, are relatively narrow.

Anchored as at 6 to the end of marginal flanges 2 of the body B are the hand grasps or handles 7, herein disclosed as of a loop type. From the foregoing it is believed to be obvious that the tray as herein embodied provides for the baking of indiivdual pies and it is further observed that the general contour of the tray is such as to permit the use of a plurality of trays within a baking oven in a manner whereby substantially all of the oven space is utilized.

It is also believed to be obvious that the portions 4 and 5 provide effective means to allow the edges of the pie crust to be effectively sealed so that when an individual pie piece is served, the liability of the filler falling out is substantially eliminated as often occurs in serving a cut piece of pie.

It is therefore believed to be obvious that the tray as herein embodied is one which is particularly advantageous for use by bakeries or such other places where pies are baked in relatively large quantities.

In the embodiment of the invention as illustrated in Figures 5 and 6, the body C is circular in plane and is formed of a single sheet 8 of material and has its central portion depressed to form the equi-distantly and circumferentially spaced pie pans P in the general form of a sector of a circle with, of course, the apieces thereof inwardly disposed and terminating at close proximity to the axial center of the tray C.

The bottoms 9 of the pans P are flush or coplanar so that the tray will have desired level placing on the oven surface and the adjacent pans P are separated by the relatively narrow top surface 10 also preferably flush and coplanar while the periphery of the tray C is defined by the surrounding outstanding flange 11. The portions 5 and 10 of the trays B and C respectively are provided thereon at substantially the transverse centers thereof with the grooves 12 which serve as guides for the knife in cutting the pie crusts properly.

From the foregoing description it is thought to be obvious that a baking tray constructed in accordance with my invention is particularly well adapted for use by reason of the convenience and facility with which it may be assembled and operated. The grooves 12 are shallow and V- shaped in cross section, so that the bottom thereof provides a guide to maintain a knife blade in a true straight line without any lateral deviation. The grooves 12 also extend the full length of the adjacent sides of the adjacent depressions or pipe pans and beyond a line extending between the adjacent apexes of said pans, whereby the several individual pies may be accurately, evenly and quickly separated without uneven or ragged severance at any of the angles thereof.

I claim:

As an article of manufacture, a pie tray comprising a one piece imperforate body in the form of a parallelogram and with the transverse dimension materially less than the longitudinal dimension, said body having a plurality of adjacent interfitting triangular depressions each constituting a pie pan, and arranged with alternate ones thereof having their apices directed oppositely to those between, the upper marginal portions of the adjacent depressions or pans being separated by narrow web portions, and each of said web portions having a shallow groove extending throughout the length of the top surface thereof, and each groove intersecting an adjacent groove, said grooves being adapted to receive the cutting edge of a knife, and hand grasps carried by the ends of the tray.

LINZA A. COLLINS.

REFERENCES CITED

The following references are of record in the file of this patent:

UNITED STATES PATENTS

| Number | Name | Date |
| --- | --- | --- |
| 476,340 | Wagandt | June 7, 1892 |
| 1,021,640 | Steitler | Mar. 26, 1912 |
| 1,186,796 | Kehoe | June 13, 1916 |
| 1,716,556 | Kones | June 11, 1929 |
| 1,938,909 | Huff | Dec. 12, 1933 |
| 2,037,280 | Smith | Apr. 14, 1936 |